US012212547B2

(12) United States Patent
Griffin et al.

(10) Patent No.: US 12,212,547 B2
(45) Date of Patent: Jan. 28, 2025

(54) FLOATING PV SERVICE FOR MESH SECURE MESSAGE TRANSFER

(71) Applicant: Red Hat, Inc., Raleigh, NC (US)

(72) Inventors: Leigh Griffin, Waterford (IE); Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 401 days.

(21) Appl. No.: 17/648,658

(22) Filed: Jan. 21, 2022

(65) Prior Publication Data

US 2023/0239275 A1 Jul. 27, 2023

(51) Int. Cl.
*H04L 9/40* (2022.01)

(52) U.S. Cl.
CPC ................ *H04L 63/04* (2013.01)

(58) Field of Classification Search
CPC .......... H04L 63/04; H04L 63/10; G06F 21/70
See application file for complete search history.

(56) References Cited

U.S. PATENT DOCUMENTS

| 10,542,487 | B2* | 1/2020 | Shaw .................. H04W 12/062 |
| 10,798,216 | B2 | 10/2020 | Berdy et al. |
| 10,963,235 | B2 | 3/2021 | Holman et al. |
| 11,025,627 | B2 | 6/2021 | Li et al. |
| 11,138,030 | B2 | 10/2021 | Vyas et al. |
| 11,188,561 | B2* | 11/2021 | Natanzon .................. G06F 8/65 |
| 11,422,900 | B2* | 8/2022 | Bhavanarushi ..... G06F 11/1451 |
| 11,445,035 | B2* | 9/2022 | Duggal .................... H04L 67/34 |
| 11,650,856 | B2* | 5/2023 | Chen ......................... G06F 8/60 |
| | | | 718/104 |
| 2018/0242379 | A1 | 8/2018 | Turon et al. |
| 2020/0127980 | A1 | 4/2020 | Smith et al. |
| 2021/0126826 | A1 | 4/2021 | Nolan et al. |
| 2021/0271565 | A1* | 9/2021 | Bhavanarushi ..... G06F 11/1464 |
| 2021/0392056 | A1* | 12/2021 | Duggal ............... H04L 41/5019 |

OTHER PUBLICATIONS

Boo, EunSeong, et al. "Towards Supporting IOT Device Storage and Network Security Using DTLS" Proceedings of the 17th Annual International Conference on Mobile Systems, Applications, and Services, 2019, 2 pages.

* cited by examiner

*Primary Examiner* — Hosuk Song
(74) *Attorney, Agent, or Firm* — Womble Bond Dickinson (US) LLP (57) ABSTRACT

Embodiments of the present disclosure provide a method, a system and a non-transitory computer-readable medium to securely pass a message. The method includes executing, by a processing device, a floating persistent volumes service (FPVS) to allocate and attach persistent volume (PV) to a first node in a mesh network to pass a payload in the PV to the first node; and sending a first message to the first node to inform the first node to read data from the payload in the PV.

21 Claims, 9 Drawing Sheets

Receive a request from a second node to allocate and attach PV to the second node to pass a message to a first node
402a Allocate and attach the PV to the second node for the second node to write the message
404a Receive an indication of a completion of the writing the message from the second node and detach the PV from the second node
406a Allocate and attach the PV to the first node
408a Send a message to the first node to instruct the first node to read the message in the PV
410a Receive a message from the first node to indicate a completion of reading the message
412a Detach the PV from the first node
414a

FLOATING PV SERVICE FOR MESH SECURE MESSAGE TRANSFER

TECHNICAL FIELD

Aspects of the present disclosure relate to mesh networks, and more particularly, to secure message passing in mesh networks.

BACKGROUND

A mesh network is a local network topology in which the infrastructure nodes connect directly, dynamically and non-hierarchically to as many other nodes as possible and cooperate with one another to efficiently route data from/to clients. With a mesh network having many individual nodes, it is challenging to securely pass messages. Any potential network call or point to point call may introduce a potential attack vector. It is difficult to handle provable security which is required for items such as loading cryptographic keys for signing in a distributed mesh network. Currently, items requiring provable security are often done by hand and delivered in person.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Mesh networking is an approach to organizing device-to-device (node-to-node) communication within Internet of Things (IoT) platforms. From an TOT perspective, a mesh network includes many individual nodes, which connect directly, dynamically and non-hierarchically to as many other nodes as possible and cooperate with one another to efficiently route data from/to clients. Any potential network call or point to point call may introduce a potential attack vector. It is difficult to handle provable security which is required for items such as loading cryptographic keys for signing. It is challenging to securely pass messages in a distributed mesh network.

The present disclosure addresses the above-noted and other problems by providing a solution to securely pass messages in a mesh network based on a Persistent Volume (PV). The PV is pluggable storage that can be attached to a node in a cluster environment. Floating PV Service (FPVS) may be deployed within a mesh, which has access to an underlying PV. The FPVS can allocate and attach a PV to a node, therefore making extended storage available to that node. The FPVS can target a specific node and use this capability to pass a payload between nodes, where the nodes are capable of writing to or reading from that payload. This effectively creates a message securely passing method and system, where messages are exclusively in a read/write manner, and simple encryption mechanisms may be utilized. In this way, intercepting the message becomes exceedingly difficult as no network traffic occurs. Advantageously, the messages may be passed from one node to another without network traffic, and the secret information may be transferred within the mesh network in a secure manner.

Figure 1A:
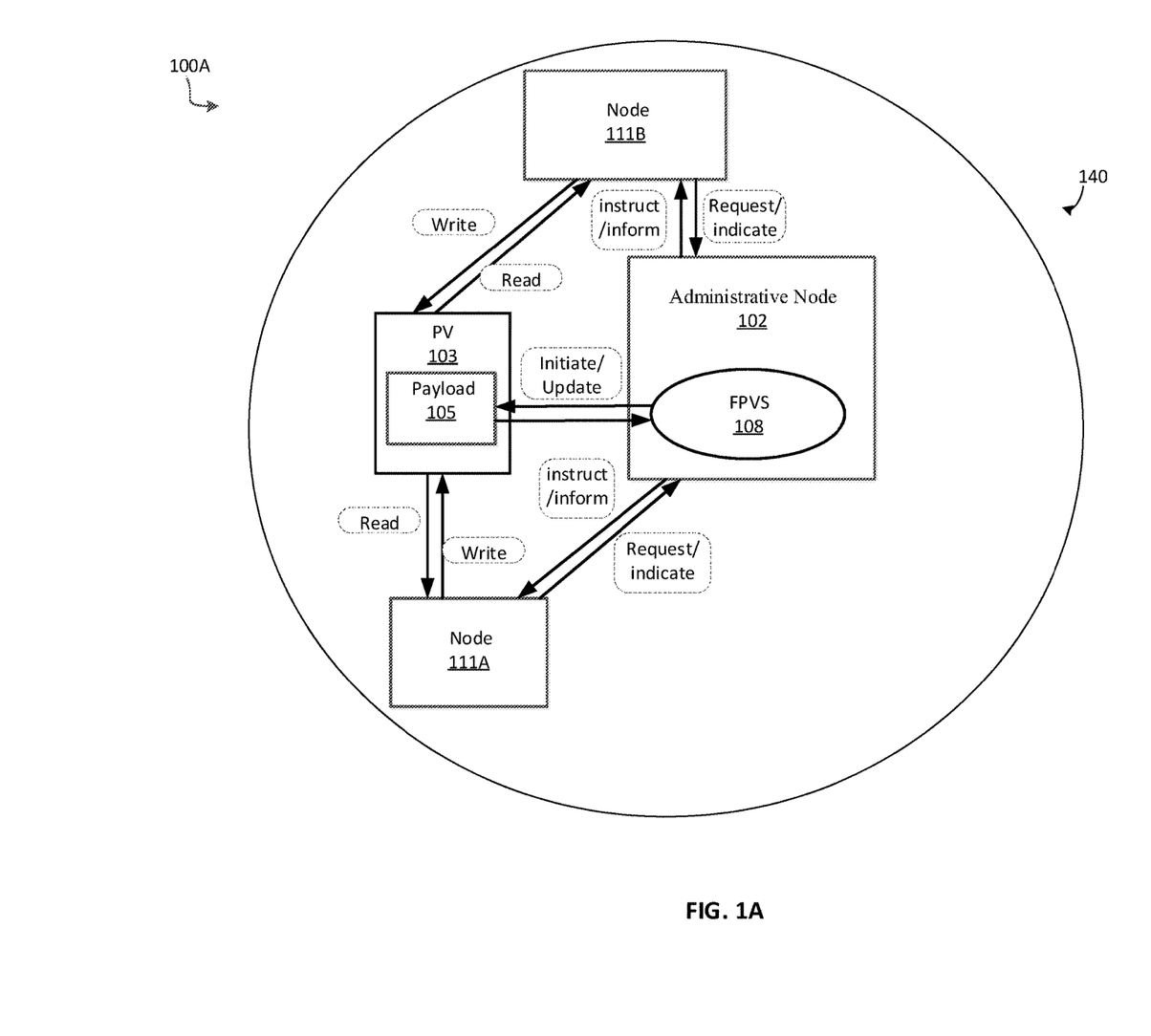
FIG. 1A is a block diagram that illustrates an example mesh network, in accordance with some embodiments of the present disclosure.

FIG. 1A is a block diagram that illustrates an example mesh network 100A, in accordance with some embodiments of the present disclosure. As illustrated in FIG. 1A, the mesh network 100A includes an administrative node 102 and a plurality of nodes (e.g., 111A, 111B). The plurality of nodes (e.g., 111A, 111B) connect directly, dynamically and non-hierarchically to as many other nodes as possible and cooperate with one another. The administrative node 102 may have the administrative power for the mesh network 100A. The administrative node 102 may oversee and manage the mesh network. The administrative node 102 may have information of the membership of the mesh network 100A. The administrative node 102 may know the type and capability of each node in the mesh network. For example, the administrative node 102 may have information of how to access each node in the mesh network 100A. Each node in the mesh network may have a node identifier (node ID). Since the membership of the mesh network may constantly change with nodes joining and leaving, the administrative node 102 may manage and update the membership of the mesh network.

Each of the administrative node 102 and/or the plurality of nodes (e.g., 111A, 111B) may be coupled to each other (e.g., may be operatively coupled, communicatively coupled, may communicate data/messages with each other) via network 140. The mesh network 110A may be based on the network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and registry server 130.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1A, the administrative node 102 may execute an FPVS 108 to allocate and attach PV 103 to a node 111A in the mesh network 100A to pass a payload 105 in the PV to the node. The payload 105 may contain secret information that requires provable security. The administrative node 102 may send a message to the node 111A to inform the node to read data from the payload 105 in the PV 103. The node 111A may also write data to the payload 105 in the PV 103. After the node 111A completes reading data from the payload 105, the node 111A may send a message to inform the administrative node 102. The administrative node 102 may execute the FPVS 108 to detach the PV 103 from the node 111A.

The administrative node 102 may initiate the payload 105. The administrator node 102 may access the PV 103 for initial provisioning or updating of the payload (or secrets) 105. The administrator node 102 may further create a route for passing the payload 105 among the nodes (e.g., 111A, 111B) in the mesh network 100A.

The payload 105 may be a message (e.g., secret message) to the node 111A from a node 111B. The administrative node 102 may receive a request from the node 111B to allocate and attach the PV 103 to the second node to pass the payload 105 to the node 111A. The administrative node 102 may execute the FPVS 108 to allocate and attach the PV 103 to the node 111B, in order to enable the node 111B to write data to the payload 105 in the PV 103.

Each of the administrative node 102 and/or the plurality of nodes (e.g., 111A, 111B) may include hardware such as processing device 202 (e.g., processors, central processing units (CPUs)), memory 204 (e.g., random access memory (RAM), storage devices (e.g., hard-disk drive (HDD)), and solid-state drives (SSD), etc.), and other hardware devices (e.g., sound card, video card, etc.).

PV 103 may be a pluggable storage that can be attached to a node in a cluster environment. PV 103 may be a remote storage unit or a virtual storage unit. PV may be a magnetic storage unit, optical storage unit, solid state storage unit, electronic storage units, or similar storage unit. PV may also be a monolithic/single device or a distributed set of devices. Each PV may have a PV identifier (PV ID).

Each of the administrative node 102 and/or the plurality of nodes (e.g., 111A, 111B) may comprise any suitable type of computing device or machine that has a programmable processor including, for example, server computers, desktop computers, laptop computers, tablet computers, smartphones, set-top boxes, etc. The administrative node 102 and/or the plurality of nodes (e.g., 111A, 111B) may be implemented by a common entity/organization or may be implemented by different entities/organizations. For example, the administrative node 102 may be operated by a first company/corporation and some of the plurality of nodes may be operated by a second company/corporation. The administrative node 102 and/or the plurality of nodes (e.g., 111A, 111B) may each execute or include an operating system (OS). The OSs of administrative node computing device 102 and/or the plurality of nodes (e.g., 111A, 111B) may manage the execution of other components (e.g., software, applications, etc.) and/or may manage access to the hardware (e.g., processors, memory, storage devices etc.).

Although FIG. 1A shows only an administrative node 102 and two nodes 111A, 111B in the mesh network 100A, the mesh network 100A may include any number of nodes which connect directly, dynamically and non-hierarchically to as many other nodes as possible and cooperate with one another.

Figure 1B:
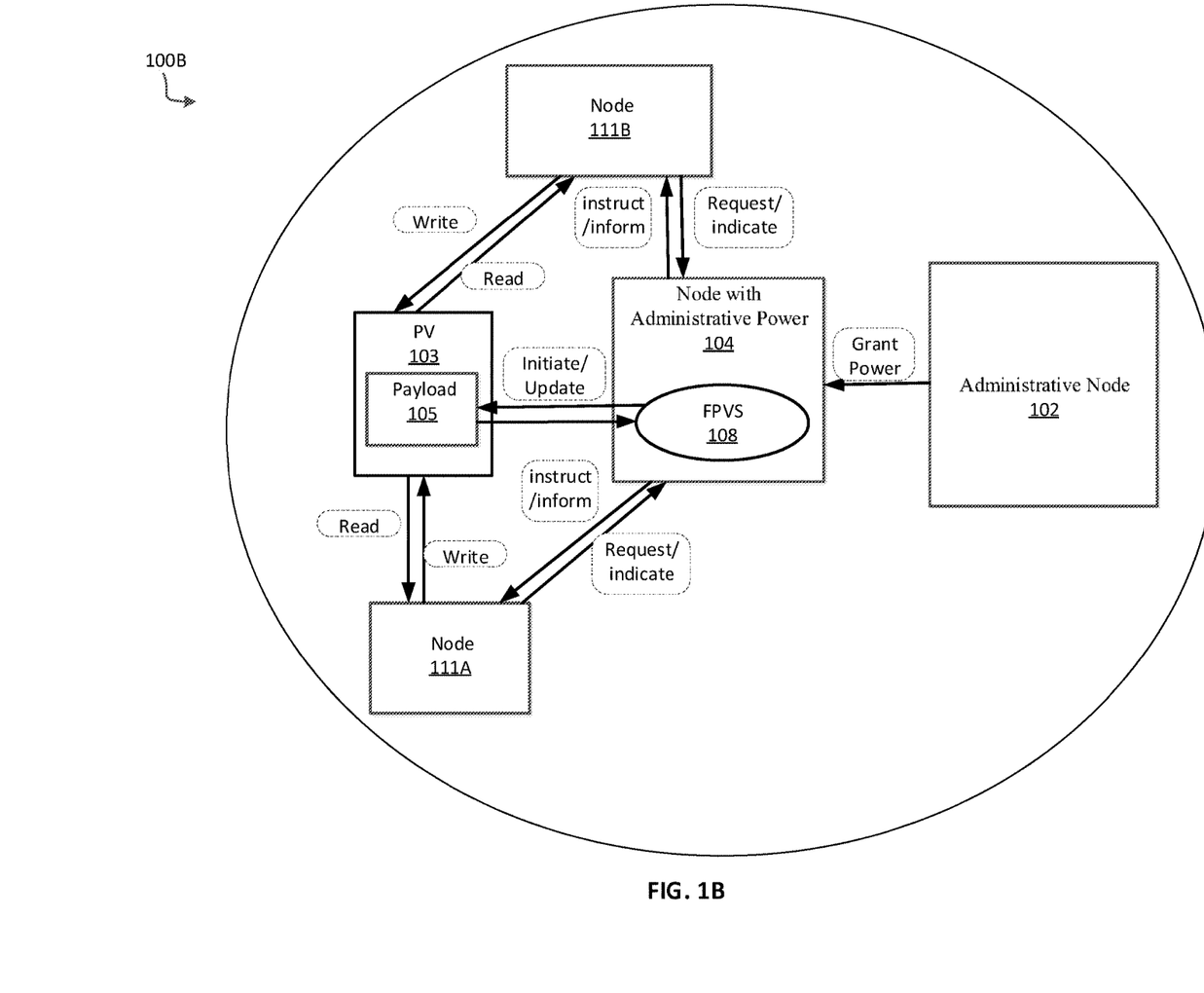
FIG. 1B is a block diagram that illustrates another example mesh network, in accordance with some embodiments of the present disclosure.

FIG. 1B is a block diagram that illustrates another example mesh network 110B, in accordance with some embodiments of the present disclosure. The FPVS 108 may run on any node in the mesh network, as long as the node has administrative power. As illustrated in FIG. 1B, the administrative node 102 may grant administrative power to a node 104. For example, the node 104 may get information of the membership of the mesh network 110B from the administrative node 102. The node 104 may know all the nodes in the mesh network 110B, and have information of how to access each node in the mesh network 110B.

The node 104 with administrative power may execute the FPVS 108 to allocate and attach PV 103 to the node 111A in the mesh network 110B to pass the payload 105 in the PV to the node. The node 104 may send a message to the node 111A to inform the node to read data from the payload 105 in the PV 103. After the node 111A completes reading data from the payload 105, the node 111A may send a message to inform the node 104 to execute the FPVS 108 to detach the PV 103 from the node 111A.

Figure 2A:
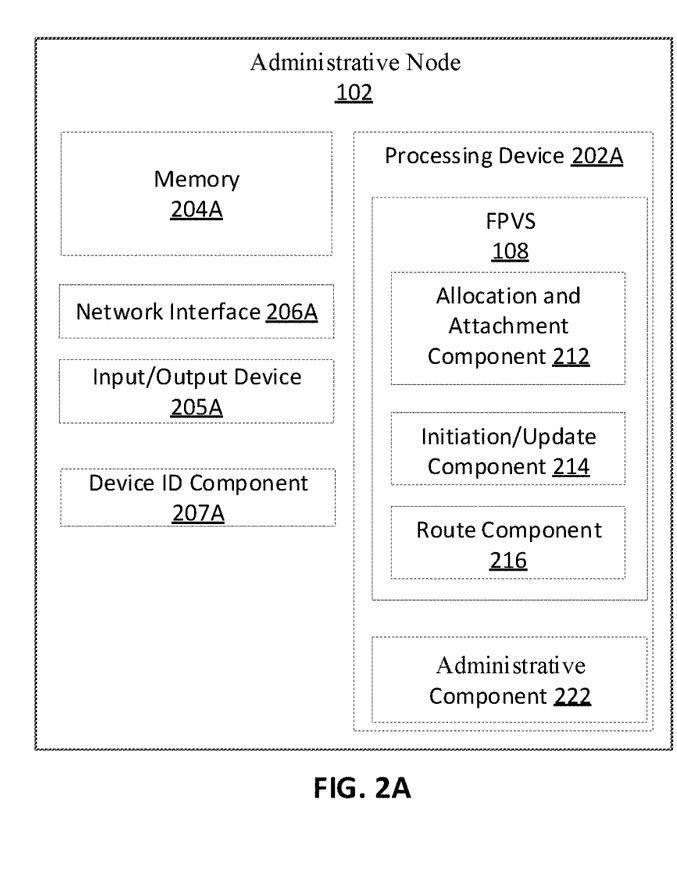
FIG. 2A is a block diagram that illustrates an example administrative node in a mesh network in accordance with some embodiments of the present disclosure.

FIG. 2A is a block diagram that illustrates an example administrative node 102 in a mesh network in accordance with some embodiments of the present disclosure. While various devices, interfaces, components and logic with particular functionality are shown, it should be understood that the administrative nod 102 includes any number of devices and/or components, interfaces, and logic for facilitating the functions described herein. For example, the activities of multiple devices may be combined as a single device and implemented on a same processing device (e.g., processing device 202A), as additional devices and/or components with additional functionality are included.

The administrative node 102 includes a processing device 202A (e.g., general purpose processor, a PLD, etc.), which may be composed of one or more processors, and a memory 204A (e.g., synchronous dynamic random access memory (DRAM), read-only memory (ROM)), which may communicate with each other via a bus (not shown).

The processing device 202A may be provided by one or more general-purpose processing devices such as a microprocessor, central processing unit, or the like. In some embodiments, processing device 202A may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202A may comprise one or more special-purpose processing devices such as an application specific integrated circuit (ASIC), a field programmable gate array (FPGA), a digital signal processor (DSP), network processor, or the like. The processing device 202A may be configured to execute the operations described herein, in accordance with one or more aspects of the present disclosure, for performing the operations and steps discussed herein.

The memory 204A (e.g., Random Access Memory (RAM), Read-Only Memory (ROM), Non-volatile RAM (NVRAM), Flash Memory, hard disk storage, optical media, etc.) of processing device 202A stores data and/or computer instructions/code for facilitating at least some of the various processes described herein. The memory 204A includes tangible, non-transient volatile memory, or non-volatile memory. The memory 204A stores programming logic (e.g., instructions/code) that, when executed by the processing device 202A, controls the operations of the client device 102. In some embodiments, the processing device 202A and the memory 204A form various processing devices and/or circuits described with respect to the client device 102. The instructions include code from any suitable computer programming language such as, but not limited to, C, C++, C#, Java, JavaScript, VBScript, Perl, HTML, XML, Python, TCL, and Basic.

The processing device 202A may execute the FPVS 108 to allocate and attach the PV to a first node in a mesh network to pass a payload in the PV to the first node. The processing device 202A may send a first message to the first node to inform the first node to read data from the payload in the PV. As illustrated in FIG. 2A, the PFVS 108 may include an allocation and attachment component 212 to allocate resource and attach the PV to a node. The PFVS 108 may include an initiation and update component 214 to initiate the payload and update the payload. The PFVS 108 may further include a route component 216 to create a route for the payload.

The processing device 202A may include an administrative component 222 to perform administrative functions of the mesh network. The administrative component 222 may oversee and manage the mesh network. The administrative component 222 may have information of the membership of the mesh network. The administrative component 222 may know the type and capability of each node in the mesh network. For example, the administrative component 222 may access to a node and send instructions to the node in the mesh network.

In some embodiments, the payload may comprise one or more entries, and each entry of the one or more entries may comprise a target node identifier (ID) of a target node associated with an entry.

In some embodiments, the first node is to search for an entry comprising a target node ID that matches a node ID of the first node, and wherein the first node is to read data from the entry comprising the target node ID.

In some embodiments, the processing device 202A may receive a second message from the first node, and execute the FPVS 108 to detach the PV from the first node in response to the second message.

In some embodiments, the processing device 202A may receive a request from a second node in the mesh network to allocate and attach the PV to the second node to pass the payload to the first node. The processing device 202A may execute the FPVS 108 to allocate and attach the PV to the second node in the mesh network to enable the second node to write data to the payload in the PV.

In some embodiments, the processing device 202A may execute the FPVS 108 to allocate and attach the PV to one or more nodes node with a similar architecture or firmware version in the mesh network.

The administrative node 102 includes a network interface 206A configured to establish a communication session with a node (e.g., a computing device) for sending and receiving data over the mesh network. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the administrative node 102 includes a plurality of network interfaces 206A of different types, allowing for connections to a variety of networks, such as local area networks (public or private) or wide area networks including the Internet, via different sub-networks.

The administrative node 102 includes an input/output device 205A configured to receive user input from and provide information to a user. In this regard, the input/output device 205A is structured to exchange data, communications, instructions, etc. with an input/output component of the client device 102. Accordingly, input/output device 205A may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the administrative node 102, such as a built-in display, touch screen, microphone, etc., or external to the housing of the administrative node 102, such as a monitor connected to the administrative node 102, a speaker connected to the administrative node 102, etc., according to various embodiments. In some embodiments, the administrative node 102 includes communication circuitry for facilitating the exchange of data, values, messages, and the like between the input/output device 205A and the components of the administrative node 102. In some embodiments, the input/output device 205A includes machine-readable media for facilitating the exchange of information between the input/output device 205A and the components of the administrative node 102. In still another embodiment, the input/output device 205A includes any combination of hardware components (e.g., a touchscreen), communication circuitry, and machine-readable media.

The administrative node 102 includes a device identification component 207A (shown in FIG. 2A as device ID component 207A) configured to generate and/or manage a device identifier associated with the administrative node 102. The device identifier may include any type and form of identification used to distinguish the administrative node 102 from other computing devices. In some embodiments, to preserve privacy, the device identifier may be cryptographically generated, encrypted, or otherwise obfuscated by any device and/or component of administrative node 102. In some embodiments, the administrative node 102 may include the device identifier in any communication (e.g., establish connection request, resource request) that the administrative node 102 sends to a node (e.g., a computing device).

The administrative node 102 includes a bus (not shown), such as an address/data bus or other communication mechanism for communicating information, which interconnects the devices and/or components of administrative node 102, such as processing device 202A, network interface 206A, input/output device 205A, device ID component 207A, and management component 210a.

In some embodiments, some or all of the devices and/or components of administrative node 102 may be implemented with the processing device 202A. For example, the administrative node 102 may be implemented as a software application stored within the memory 204A and executed by the processing device 202A. Accordingly, such embodiment can be implemented with minimal or no additional hardware costs. In some embodiments, any of these above-recited devices and/or components rely on dedicated hardware specifically configured for performing operations of the devices and/or components.

Figure 2B:
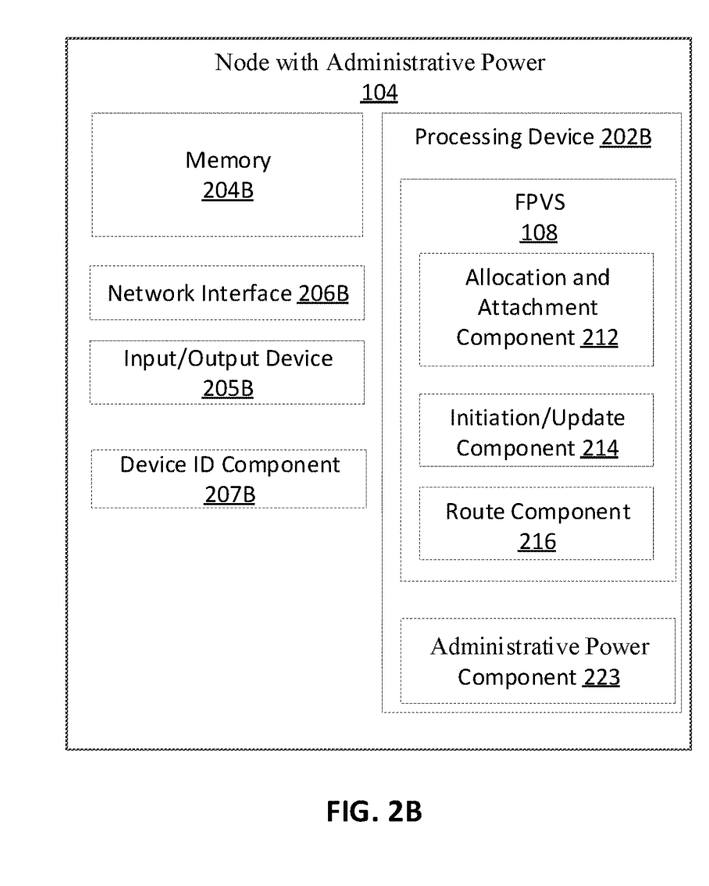
FIG. 2B is a block diagram that illustrates an example node with administrative power in a mesh network in accordance with some embodiments of the present disclosure.

FIG. 2B is a block diagram that illustrates an example node with administrative power 104 in a mesh network, in accordance with some embodiments of the present disclosure. The FPVS 108 may run on any node in the mesh network, as long as the node has administrative power. As illustrated in FIG. 2B, the administrative node 102 may grant administrative power to the node 104 such that the node 104 may have administrative power. For example, the node 104 may get information of the membership of the mesh network from the administrative node 102. The node 104 may know all the nodes in the mesh network, and have information of how to access each node in the mesh network.

The node with administrative power 104 includes a processing device 202B, a memory 204B, a network interface 206B, an input/output device 205B and a device ID component 207B with functions similar to that of the processing device 202A, the memory 204A, the network interface 206A, the input/output device 205A and the device ID component 207A.

The processing device 202B may execute the FPVS 108 to allocate and attach the PV to a first node in a mesh network to pass a payload in the PV to the first node. The processing device 202B may send a first message to the first node to inform the first node to read data from the payload in the PV. As illustrated in FIG. 2B, the PFVS 108 may include an allocation and attachment component 212, an initiation and update component 214 and a route component 216.

The processing device 202B may include an administrative power component 223 to execute the FPVS 108. The administrative power component 223 may have the information of the membership of the mesh network. For example, the administrative power component 223 may access to a node and send instructions to the node in the mesh network.

Figure 2C:
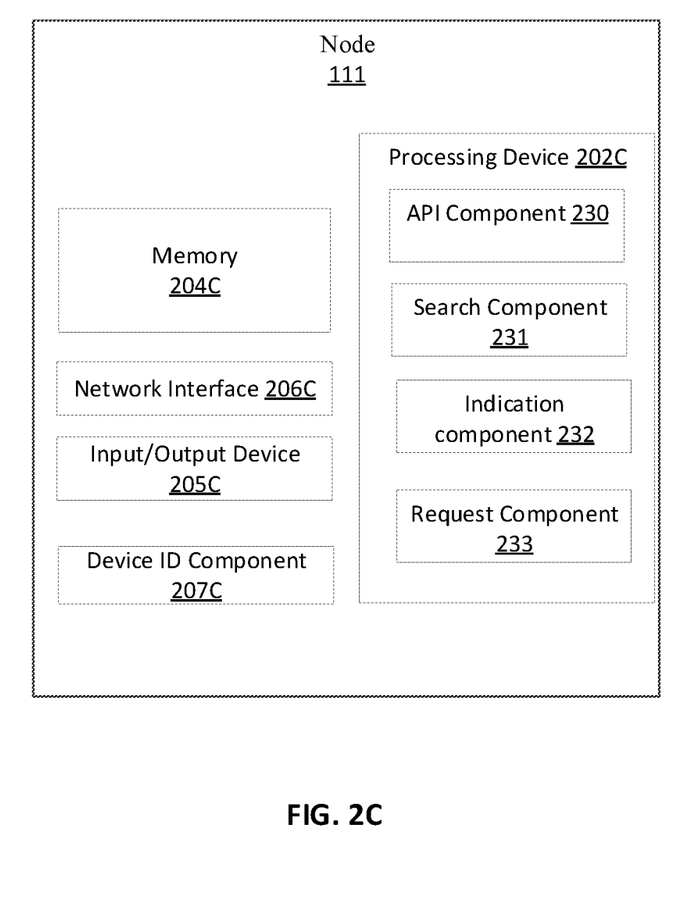
FIG. 2C is a block diagram that illustrates an example node in a mesh network, in accordance with some embodiments of the present disclosure.

FIG. 2C is a block diagram that illustrates an example node 111A in a mesh network, in accordance with some embodiments of the present disclosure. While various devices, interfaces, component and logic with particular functionality are shown, it should be understood that the node 111A includes any number of devices and/or components, interfaces, and logic for facilitating the functions described herein. For example, the activities of multiple devices may be combined as a single device and implemented on a same processing device (e.g., processing device 202B), as additional devices and/or components with additional functionality are included.

The node 111A includes a processing device 202C (e.g., general purpose processor, a PLD, etc.), which may be composed of one or more processors, and a memory 204C (e.g., synchronous dynamic random access memory (DRAM), read-only memory (ROM)), which may communicate with each other via a bus (not shown). The processing device 202C includes identical or nearly identical functionality as processing device 202A in FIG. 2a, but with respect to devices and/or components of the node 111A instead of devices and/or components of the administrative nod 102.

The memory 204C of processing device 202C stores data and/or computer instructions/code for facilitating at least some of the various processes described herein. The memory 204C includes identical or nearly identical functionality as memory 204A in FIG. 2A, but with respect to devices and/or components of the node 111A instead of devices and/or components of the administrative node 102.

The processing device 202C may include an Application Programming Interface (API) component 230 to communicate with the FPVS 108. The processing device 202C may include a search component 231 to search for an entry in the PV which comprises a target node ID that matches a node ID of the node. The processing device 202C may include an indication component 232 to send a message to the administrative node or the node with administrative power to indicate a completion of reading the data from the payload. The processing device 202C may include a request component 233 to request to allocate and attach the PV to the node to pass the payload to another node.

The processing device 202C may receive a first message from the administrative node or the node with administrative power to read data from the payload in the PV. In some embodiments, the node 111A is to search for an entry comprising a target node ID that matches a node ID of the node, and wherein the node is to read data from the entry comprising the target node ID. In some embodiments, the node 111A is to send a second message from the first node to indicate a completion of reading the data from the payload. In some embodiments, the node 111A is to send a request to the administrative node or the node with administrative power to allocate and attach the PV to the node 111A to pass the payload to the another node.

The node 111A includes a network interface 206C configured to establish a communication session with a node (e.g., a computing device) for sending and receiving data over the mesh network. Accordingly, the network interface 206C includes identical or nearly identical functionality as network interface 206A in FIG. 2A, but with respect to devices and/or components of the node 111A instead of devices and/or components of the administrative node 102.

The node 111A includes an input/output device 205C configured to receive user input from and provide information to a user. In this regard, the input/output device 205C is structured to exchange data, communications, instructions, etc. with an input/output component of the node 111A. The input/output device 205B includes identical or nearly identical functionality as input/output device 205A in FIG. 2A, but with respect to devices and/or components of the node 111A instead of devices and/or components of the administrative node 102.

The node 111A includes a device identification component 207C (shown in FIG. 2B as device ID component 207C) configured to generate and/or manage a device identifier associated with the node 111A. The device ID component 207C includes identical or nearly identical functionality as device ID component 207A in FIG. 2A, but with respect to devices and/or components of the node 111A instead of devices and/or components of the administrative node 102.

The node 111A includes a bus (not shown), such as an address/data bus or other communication mechanism for communicating information, which interconnects the devices and/or components of the node 111A, such as processing device 202C, network interface 206C, input/output device 205C, device ID component 207C, and the memory 204C.

In some embodiments, some or all of the devices and/or components of node 111A may be implemented with the processing device 202C. For example, the node 111A may be implemented as a software application stored within the memory 204C and executed by the processing device 202C. Accordingly, such embodiment can be implemented with minimal or no additional hardware costs. In some embodiments, any of these above-recited devices and/or components rely on dedicated hardware specifically configured for performing operations of the devices and/or components.

Figure 3:
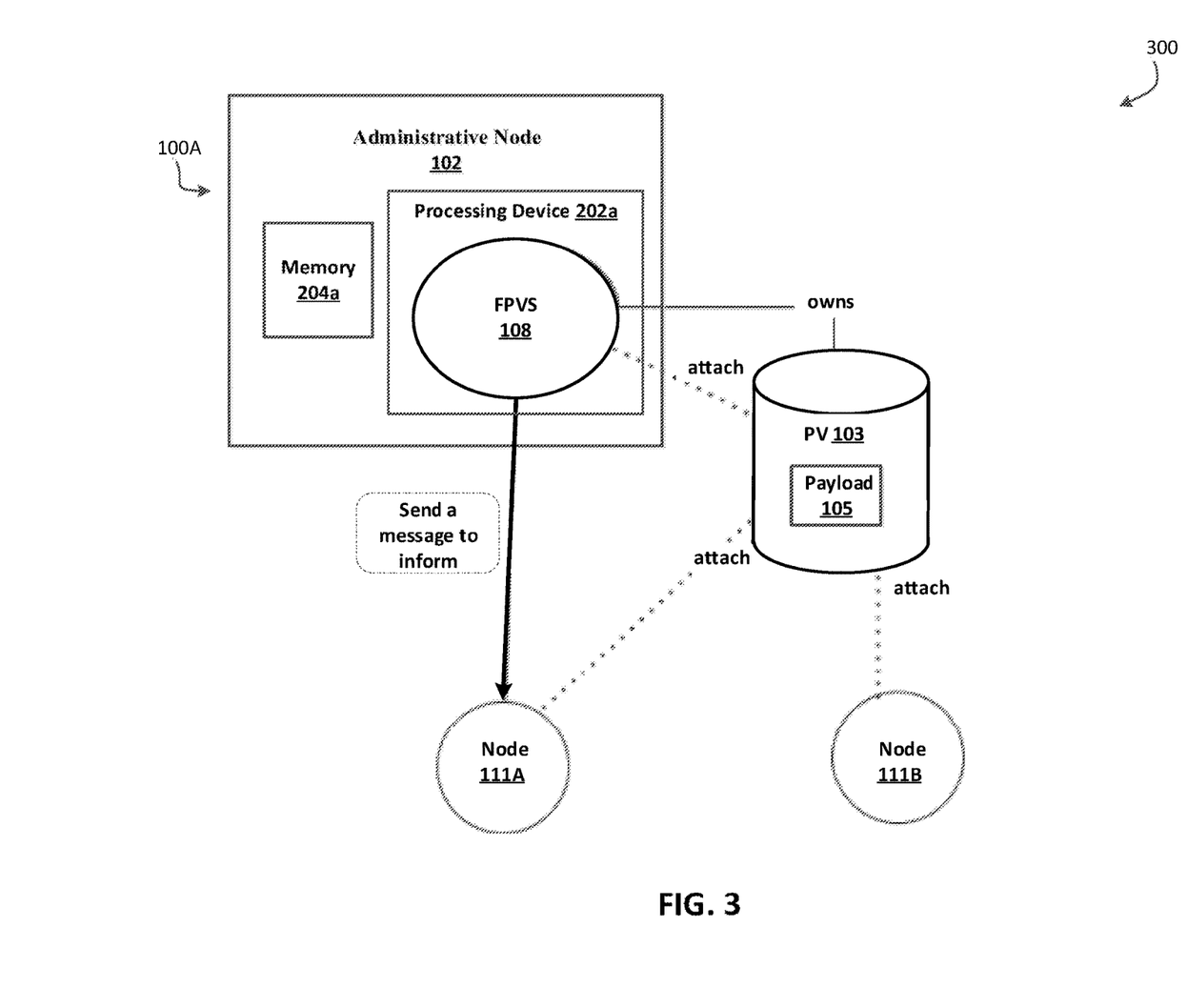
FIG. 3 is a block diagram that illustrates securely passing a message in a mesh network, in accordance with some embodiments of the present disclosure.

FIG. 3 is a block diagram 300 that illustrates securely passing of a message in a mesh network, in accordance with some embodiments of the present disclosure. It is challenging to handle provable security which is required for messages such as loading cryptographic keys in a distributed mesh network. Any potential network call or point to point call may introduce a potential attack vector. Currently, messages requiring provable security are often delivered by hand in person.

In order to solve the above problem and securely pass a message, the PV 103 may be attached to a node (e.g., 111A,111B) in a mesh network 110A or a cluster environment. The administrative node 102 of the mesh network 110A may comprise the memory 204A and the processing device 202A operatively coupled to the memory. The processing device 202A may execute the FPVS 108 to allocate and attach the PV 103 to a node (e.g., 111A) in a mesh network 100A to pass the payload 105 in the PV 103 to the node (e.g., 111A). The processing device 202A may send a first message to the node (e.g., 111A) to inform the node (e.g., 111A) to read data from the payload 105 in the PV103. The PV 103 may be a pluggable storage. For example, the PV may be a remote storage, a virtual storage, a cloud storage, or a global storage, etc. The PV may expand the memory footprint on a node (or a device) in an extensible and dynamic way.

FPVS 108 may be deployed within the mesh network, which has access to the underlying PV 103. The FPVS 108 may allocate the resource and attach or mount the PV103 to a node (e.g., node 111A), and make the extended storage available to the node. The FPVS 108 may target a specific node and pass a payload between nodes by using the PV103. For example, the payload may be passed to the PV 103. When the PV 103 attaches to the node 111A, data in the PV 103 is effectively seated within the node 111A, which allows a message, e.g., cryptographic keys or a message in a text file, to be read by the node 111A. Therefore, the message may be passed to the node 111A. The node 111A may also write data to the payload as well.

Utilizing the FPVS 108, a route may be created to pass the message. For example, the PV 103 may be attached to the node 111A, delivered a message to the node 111A and received some contents from the node 111A. The node 111A may send a message to the FPVS to indicate that reading the message is completed. The PV 103 may be disconnected from the node 111A and attached to the node 111B, deliver the message to the node 111B and received some contents from the node 111B. The PV 103 may be disconnected from the node 111B and attached to another node, and continue the process of passing the message.

The message may be passed securely in the mesh network, because the only node that can read the message is the node that has the PV attached to. By attaching or detaching the PV (e.g., 103) to the nodes (e.g., node 111A, node 111B) in the mesh network, the message may be securely passed from one node to another node in the mesh network without having a network call between these two nodes. The nodes (e.g., node 111A, node 111B) are capable of writing to or reading from the payload in the PV (e.g., 103). This effectively creates a message securely passing method and system, where messages are exclusively in a read/write manner, and simple encryption mechanisms may be utilized. In this way, intercepting the message becomes exceedingly difficult as no network traffic occurs. The traditional over the air communication is removed. Therefore, the security of the message passing significantly improved.

The FPVS 108 may be run by an administrative node 102. The administrative node 102 may have the administrative power for the mesh network. The administrative node 102 may oversee and manage the mesh network. The administrative node 102 may have information of the membership of the mesh network. The administrative node 102 may know the type and capability of each node in the mesh network. For example, the administrative node 102 may have information of how to access each node in the mesh network. Since the membership of the mesh network may constantly change with nodes joining and leaving, the administrative node 102 may communicate with the FPVS with the updated membership of the mesh network.

The FPVS may also be run by any node in the mesh network as long as the node has been granted administrative power by the administrative node 102. The administrative node 102 may grant the administrative power to the node (e.g., node 104). The node with administrative power may have information of the membership of the mesh network. The node with administrative power may further know the type and capability of each node in the mesh network. The node with administrative power may have information of how to access each node in the mesh network.

The nodes in the mesh network may also receive instructions from the FPVS 108. For example, the node 111A may receive a message from the FPVS to instruct or inform the node 111A to read the message in the PV 103. When the administrative node 102 attaches or mounts the PV 103 to a node within the mesh network, the FPVS 108 may contact the node to inform the node that the PV 103 has been mounted and is available to access.

The FPVS 108 may be available to all the nodes in the mesh network, the members of the mesh network, through the API. The nodes in the mesh network may communicate with the FPVS 108 by invoking the API. A node in the mesh network may send a message to the FPVS to request the PV to be available to the node. For example, the node 111B may contact FPVS 108 through the API to request to allocate and attach the PV 103 to the node 111B, in order to pass a secure message.

There may be different approaches to securely pass a message. The initial loading may be done by an administrator via the administrative node 102, which put into security keys. The initial loading may also be done by any member of the mesh network (e.g., 111A, 111B) that wishes to access the PV 103 and store data on it. Any node in the mesh network (e.g., 111A, 111B) may access and request the PV 103, the FPVS 108 may provision the PV 103 and make the PV 103 available to the node (e.g., 111A, 111B). Then, the node (e.g., 111A, 111B) may load the data onto the PV 103.

In some embodiments, each node can interface with the FPVS 108 and add a destination node for the PV 103, thereby making this a directed message passing in a node to node manner. For example, the node 111B may inform the FPVS 108 a target node of the message to be passed to. The node 111B may inform the FPVS 108 which node is the next node in the chain.

The message may be the payload. The payload may include one or more entries. Each entry in the payload in the PV 103 may be structured in a database style, with a target node identifier (ID). The node 111B may target other node, for example, the node 111A, with specific data. When the node 111A receives the payload in the PV 103, the node 111A may look for its identifier to read data. The node 111A may search for an entry comprising a target node ID that matches a node ID of the node 111A, and the node 111A is to read data from the entry comprising the target node ID.

In some embodiments, the administrator node 102 or the node with administrator power may create a route for the PV 103 to navigate. If the message passing is handled by API instructions to, for example, dump logs or databases, the PV 103 may start empty and fill up as the PV 103 moves from one node to another node through the mesh network. The administrator node 102 or the node with administrator power may initiate the PV 103 which may be an empty log. The administrator node 102 or the node with administrator power may create the route for the PV 103, which may include a list of nodes on the route. The PV 103 may be attached to a first node which may write data to the PV 103. Then, the PV 103 may be detached from a first node and attached to a second node which may write data to the PV 103, and so on. The PV 103 may be passed around to the list of nodes on the route.

The FPVS 108 may have the administrative power to interface each node in the mesh network. The FPVS 108 may issue mount command to mount the PV 103 to a node, making the PV available to the node as a mounted file system for access. The FPVS 108 may own and provision the PV 103. The FPVS 108 may be called by the administrator node 102 or a node with administrator power to mount the PV103 to the node (e.g., 111A) in the mesh network. The FPVS 108 may have a node ID and the route for the PV 103 to reach and communicate, from the API perspective.

The administrator node or the node with administrator power may access the PV for initial provisioning or updating of the payload (or secrets) as needed. This integration may require an extra layer of security, as it may be a target of attacks on the mesh network. For example, two factor authentication may be used in the initial provisioning of the payload.

In some embodiments, the administrator node 102 may instruct the FPVS 108 to provision the PV 103 and store a cryptographic key within the PV 103. The administrative node 102 may inform the FPVS 108 that the PV 103 with the cryptographic key needs to be sent to the list of nodes on the route. Each PV may have a PV identifier (PV ID). The administrative node 102 may inform the FPVS 108 that the PV with a specific PV ID having the cryptographic key needs to be sent to the list of nodes on the route. In this way, any network call or network traffic is avoided in passing the cryptographic key. There is no over the air transmission in passing the cryptographic key, and therefore, the cryptographic key may be securely passed in the mesh network.

The FPVS 108 may target a family of nodes and extract the data from the family of nodes in a consistent manner. For example, the FPVS 108 may target all nodes with a similar architecture or firmware version, with the data added. By this way, a singular data store representation of multiple individual nodes may be provided for deeper analysis.

In some embodiments, only one node in the mesh network may write to the PV at one time. Multiple nodes may read from the PV at the same time.

Figure 4A:
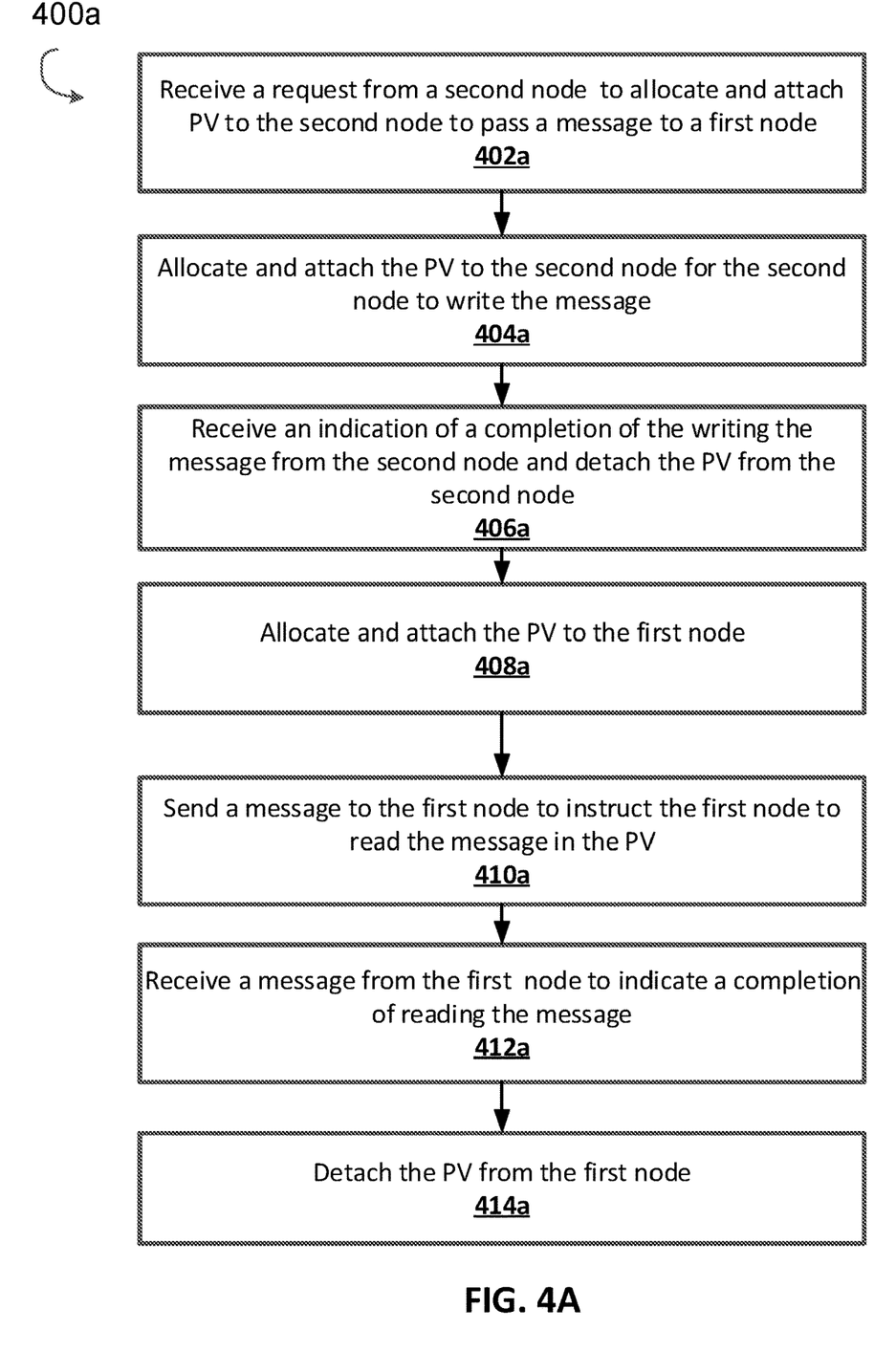
FIG. 4A is a flow diagram of one approach of securely passing a message in a mesh network, in accordance with some embodiments of the present disclosure.

FIG. 4A is a flow diagram of a method 400a of securely passing a message in a mesh network, in accordance with some embodiments of the present disclosure. Method 400a may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400a may be performed by an administrative node (e.g., 102) or a node with administrative power (e.g., 104).

With reference to FIG. 4A, the method 400a illustrates example functions used by various embodiments. Although specific function blocks ("blocks") are disclosed in method 400a, such blocks are examples. That is, embodiments are well suited to performing various other blocks or variations of the blocks recited in method 400a. It is appreciated that the blocks in method 400a may be performed in an order different than presented, and that not all of the blocks in method 400a may be performed.

As shown in FIG. 4A, at block 402a, the administrative node (e.g., 102) or the node with administrative power (e.g., 104) may receive a request from a second node (e.g., 111B) to allocate and attach PV to the second node to pass a message to a first node (e.g., 111A).

At block 404a, the administrative node (e.g., 102) or the node with administrative power (e.g., 104) may allocate and attach the PV to the second node for the second node to write the message.

At block 406a, the administrative node (e.g., 102) or the node with administrative power (e.g., 104) may receive an indication of a completion of the writing the message from the second node and detach the PV from the second node.

At block 408a, the administrative node (e.g., 102) or the node with administrative power (e.g., 104) may allocate and attach the PV to the first node.

At block 410a, the administrative node (e.g., 102) or the node with administrative power (e.g., 104) may send a message to the first node to instruct the first node to read the message in the PV.

At block 412a, the administrative node (e.g., 102) or the node with administrative power (e.g., 104) may receive a message from the first node to indicate a completion of reading the message At block 414a, the administrative node (e.g., 102) or the node with administrative power (e.g., 104) may detach the PV from the first node In this way, node to node message passing may be performed securely in the mesh network without any network calls or any network traffic, thereby increasing the provable security of the message passing.

Figure 4B:
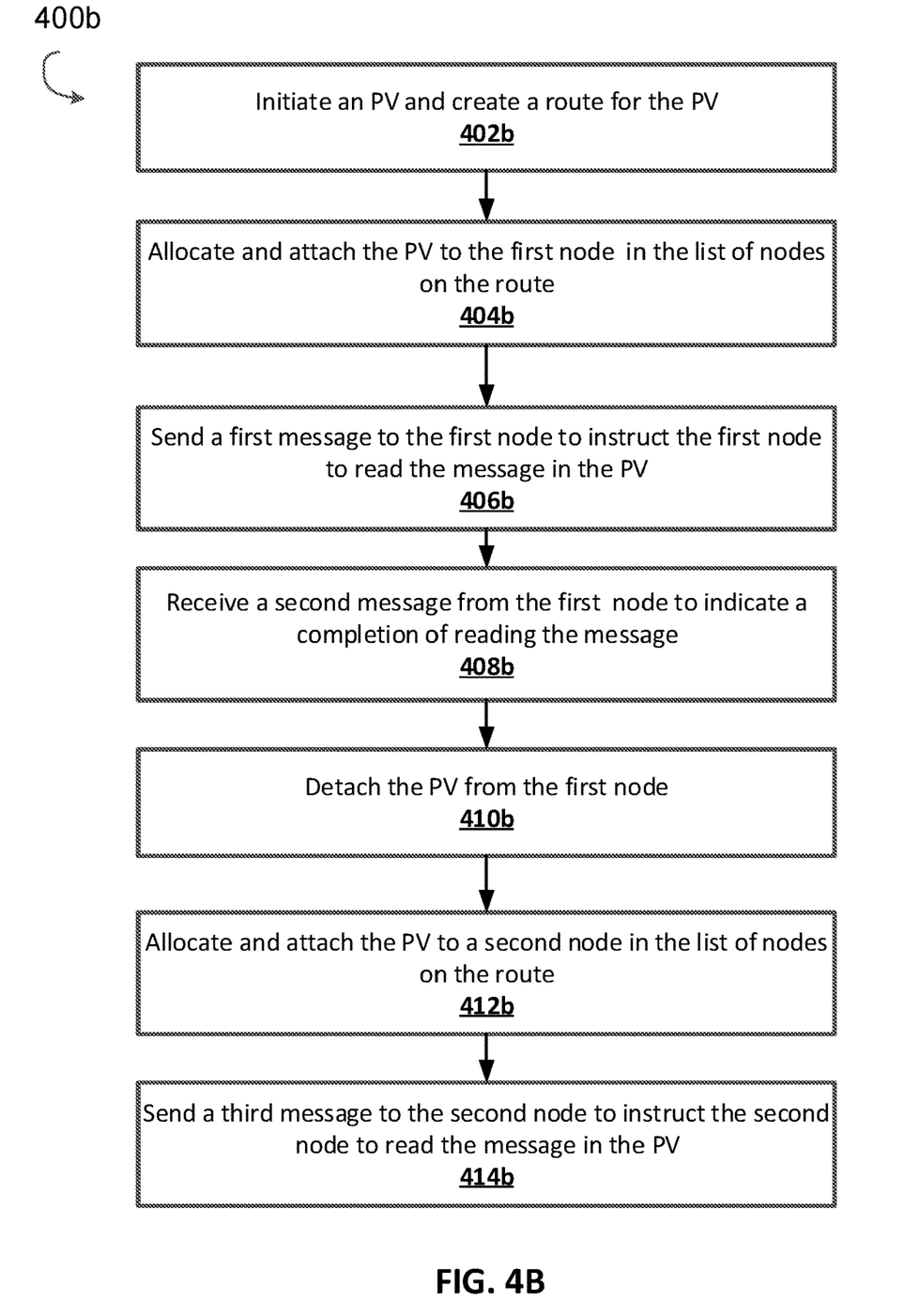
FIG. 4B is a flow diagram of one approach of securely passing a message in a mesh network, in accordance with some embodiments of the present disclosure.

FIG. 4B is a flow diagram of a method 400b of securely passing a message in a mesh network, in accordance with some embodiments of the present disclosure. Method 400b may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400b may be performed by an administrative node (e.g., 102) or a node with administrative power (e.g., 104).

With reference to FIG. 4B, the method 400b illustrates example functions used by various embodiments. Although specific function blocks ("blocks") are disclosed in method 400b, such blocks are examples. That is, embodiments are well suited to performing various other blocks or variations of the blocks recited in method 400b. It is appreciated that the blocks in method 400b may be performed in an order different than presented, and that not all of the blocks in method 400b may be performed.

As shown in FIG. 4B, at block 402b, the administrative node (e.g., 102) or the node with administrative power (e.g., 104) may initiate an PV and create a route for the PV including a list of nodes in the mesh network for the PV to be passed to.

At block 404b, the administrative node (e.g., 102) or the node with administrative power (e.g., 104) may allocate and attach the PV to the first node in the list of nodes on the route.

At block 406b, the administrative node (e.g., 102) or the node with administrative power (e.g., 104) may send a first message to the first node to instruct the first node to read the message in the PV.

At block 408b, the administrative node (e.g., 102) or the node with administrative power (e.g., 104) may receive a second message from the first node to indicate a completion of reading the message.

At block 410b, the administrative node (e.g., 102) or the node with administrative power (e.g., 104) may detach the PV from the first node.

At block 412b, the administrative node (e.g., 102) or the node with administrative power (e.g., 104) may allocate and attach the PV to a second node in the list of nodes on the route.

At block 414b, the administrative node (e.g., 102) or the node with administrative power (e.g., 104) may send a third message to the second node to instruct the second node to read the message in the PV.

In this way, the message may be securely passed from one node to another node in the mesh network without any network calls or any network traffic, thereby increasing the provable security of the message passing.

Figure 5:
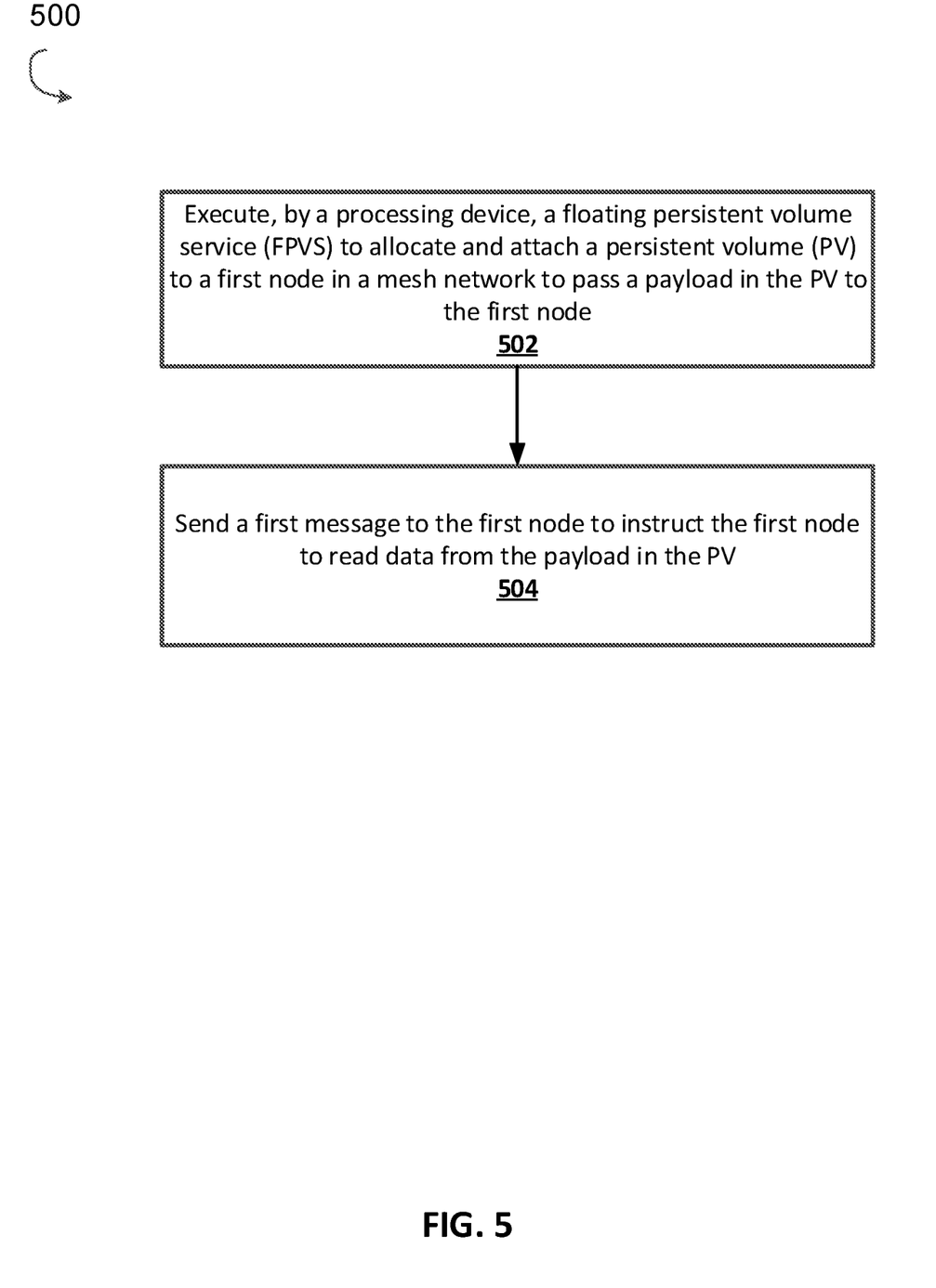
FIG. 5 is a flow diagram of securely passing a message in a mesh network, in accordance with some embodiments of the present disclosure.

FIG. 5 is a flow diagram of a method 500 of securely passing a message in a mesh network, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by an administrative node (e.g., 102) or a node with administrative power (e.g., 104).

At block 505, the method 500 includes the block 502 of executing, by a processing device (e.g., 202A, 202B) of an administrative node (e.g., 102) or a node with administrative power (e.g., 104), an FPVS to allocate and attach PV to a first node in a mesh network to pass a payload in the PV to the first node. The method 500 further includes the block 504 of sending a first message to the first node to instruct the first node to read data from the payload in the PV.

In some embodiments, the payload may comprise one or more entries, and each entry of the one or more entries may comprise a target node identifier (ID) of a target node associated with an entry.

In some embodiments, the first node is to search for an entry comprising a target node ID that matches a node ID of the first node, and wherein the first node is to read data from the entry comprising the target node ID.

In some embodiments, the processing device may receive a second message from the first node, and execute the FPVS to detach the PV from the first node in response to the second message.

In some embodiments, the processing device may receive a request from a second node in the mesh network to allocate and attach the PV to the second node to pass the payload to the first node. The processing device may execute the FPVS to allocate and attach the PV to the second node in the mesh network to enable the second node to write data to the payload in the PV.

In some embodiments, the processing device may execute the FPVS to allocate and attach the PV to one or more nodes node with a similar architecture or firmware version in the mesh network.

In this way, the messages may be passed from one node to another without network traffic, and intercepting the message becomes exceedingly difficult as no network traffic occurs. Advantageously, the method may improve the provable security of the message passing.

Figure 6:
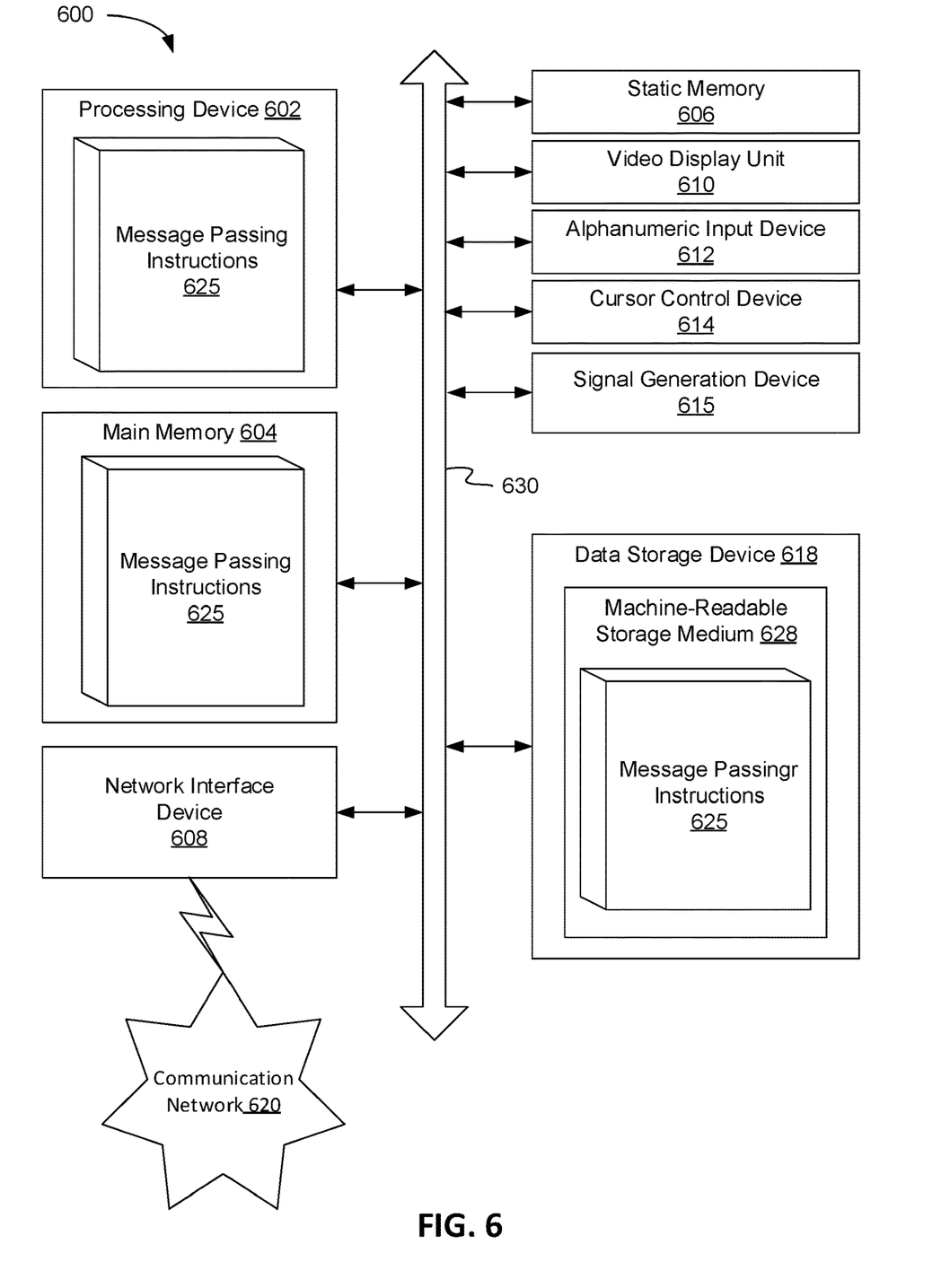
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for performing securely passing a message. In some embodiments, the machine may execute, by a processing device (e.g., 202A, 202B) of an administrative node (e.g., 102) or a node with administrative power (e.g., 104), an FPVS to allocate and attach PV to a first node in a mesh network to pass a payload in the PV to the first node. The machine may send a first message to the first node to instruct the first node to read data from the payload in the PV.

In some embodiments, the machine may be connected (e.g., networked) to other machines in a mesh network. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of the administrative node (e.g., 102) or the node with administrative power (e.g., 104).

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute message passing instructions 625, for performing the operations and steps discussed herein.

The data storage device 615 may include a machine-readable storage medium 628, on which is stored one or more sets of message passing instructions 625 (e.g., software) embodying any one or more of the methodologies of functions described herein. The message passing instructions 625 may also reside, completely or at least partially, within the main memory 604 or within the processing device 602 during execution thereof by the computer system 600; the main memory 604 and the processing device 602 also constituting machine-readable storage media. The message passing instructions 625 may further be transmitted or received over a network 620 via the network interface device 608.

While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
executing, by a processing device, a floating persistent volumes service (FPVS) to allocate and attach a persistent volume (PV) to a first node in a mesh network to pass a payload in the PV to the first node; and sending a first message to the first node to inform the first node to read data from the payload in the PV.

2. The method of claim 1, wherein the payload comprises one or more entries, and wherein each entry of the one or more entries comprises a target node identifier (ID) of a target node associated with an entry.

3. The method of claim 2, wherein the first node is to search for an entry comprising a target node ID that matches a node ID of the first node, and wherein the first node is to read data from the entry comprising the target node ID.

4. The method of claim 1, further comprising
receiving a second message from the first node to indicate a completion of reading the data from the payload; and
executing the FPVS, by the processing device, to detach the PV from the first node in response to the second message.

5. The method of claim 1, further comprising receiving, by the processing device, a request from a second node in the mesh network to allocate and attach the PV to the second node to pass the payload to the first node.

6. The method of claim 1, further comprising executing the FPVS, by the processing device, to allocate and attach the PV to a second node in the mesh network to enable the second node to write data to the payload in the PV.

7. The method of claim 1, further comprising executing the FPVS, by the processing device, to allocate and attach the PV to one or more nodes node with a similar architecture or firmware version in the mesh network.

8. A system comprising:
a memory; and
a processing device, operatively coupled to the memory, the processing device to:
execute a floating persistent volumes service (FPVS) to allocate and attach a persistent volumes (PV) to a first node in a mesh network to enable passing a payload in the PV to the first node; and
send a first message to the first node to inform the first node to read data from the payload in the PV.

9. The system of claim 8, wherein the payload comprises one or more entries, and wherein each entry of the one or more entries comprises a target node identifier (ID) of a target node associated with an entry.

10. The system of claim 8, wherein the processing device is further to:
receive a second message from the first node;
execute the FPVS to detach the PV from the first node in response to the second message.

11. The system of claim 8, wherein the first node is to search for an entry comprising a target node ID that matches a node ID of the first node, and wherein the first node is to read data from the entry comprising the target node ID.

12. The system of claim 8, wherein the processing device is further to receive a request from a second node in the mesh network to allocate and attach to the PV to the second node to pass the payload to the first node.

13. The system of claim 8, wherein the processing device is further to execute the FPVS to allocate and attach the PV to a second node in the mesh network to enable the second node to write data to the payload in the PV.

14. The system of claim 8, wherein the processing device is further to execute the FPVS to allocate and attach the PV to one or more nodes node with a similar architecture or firmware version in the mesh network.

15. A non-transitory computer-readable medium storing instructions that, when executed by a processing device, cause the processing device to:
execute, by the processing device, a floating persistent volumes service (FPVS) to allocate and attach a persistent volumes (PV) to a first node in a mesh network to enable passing a payload in the PV to the first node; and
send a first message to the first node to inform the first node to read data from the payload in the PV.

16. The non-transitory computer-readable medium of claim 15, wherein the payload comprises one or more entries, and wherein each entry of the one or more entries comprises a target node identifier (ID) of a target node associated with an entry.

17. The non-transitory computer-readable medium of claim 15, wherein the processing device is further to:
receive a second message from the first node;
execute the FPVS to detach the PV from the first node in response to the second message.

18. The non-transitory computer-readable medium of claim 15, wherein the first node is to search for an entry comprising a target node ID that matches a node ID of the first node, and wherein the first node is to read data from the entry comprising the target node ID.

19. The non-transitory computer-readable medium of claim 15, wherein the processing device is further to receive a request from a second node in the mesh network to allocate and attach to the PV to the second node to pass the payload to the first node.

20. The non-transitory computer-readable medium of claim 15, wherein the processing device is further to execute the FPVS to allocate and attach the PV to a second node in the mesh network to enable the second node to write data to the payload in the PV.

21. The non-transitory computer-readable medium of claim 15, wherein the processing device is further to execute the FPVS to allocate and attach the PV to one or more nodes node with a similar architecture or firmware version in the mesh network.

* * * * *